C. R. SCHMIDT.
FITTING FOR PLUMBING SYSTEMS.
APPLICATION FILED AUG. 14, 1908.
924,839.
Patented June 15, 1909.
3 SHEETS—SHEET 1.
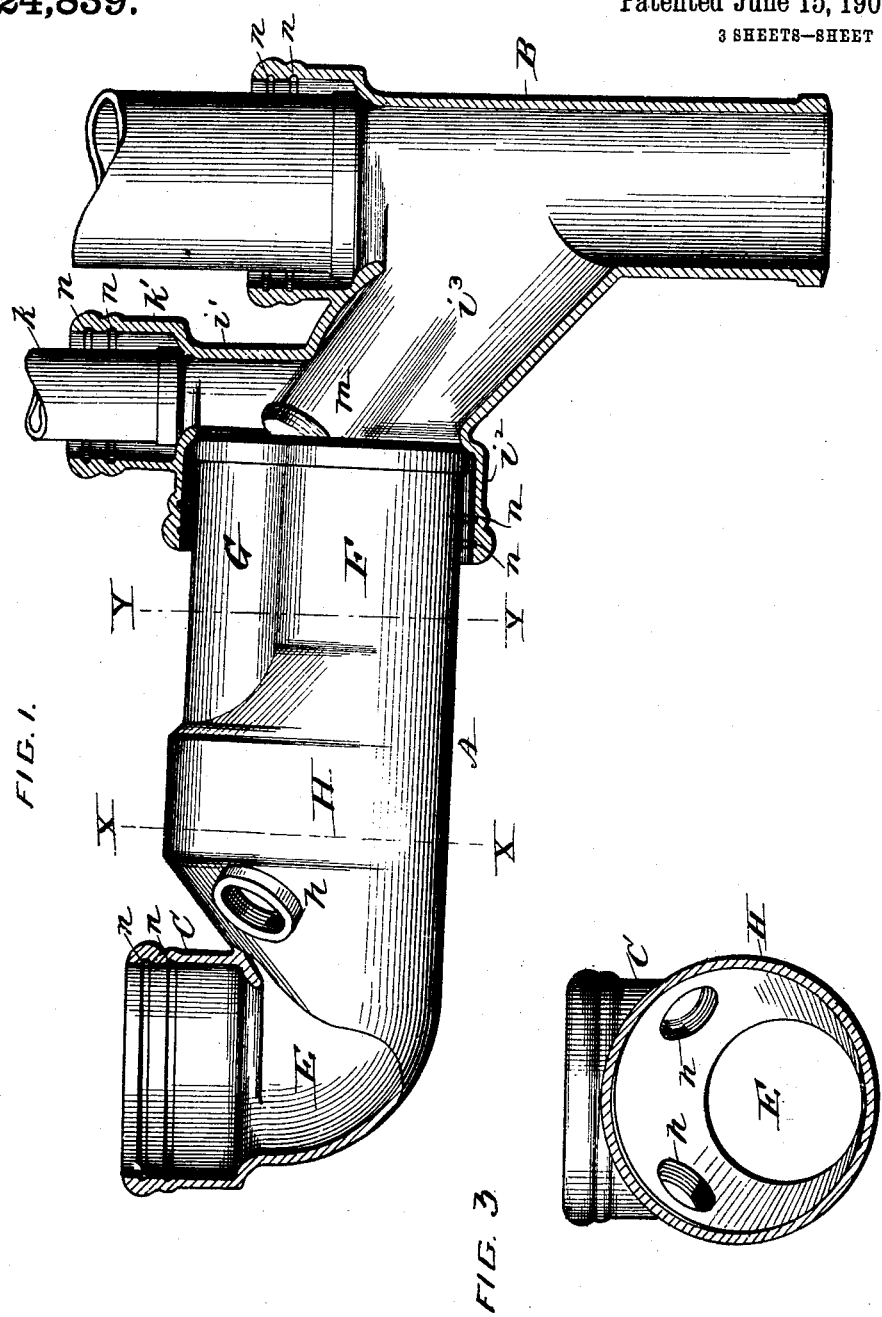

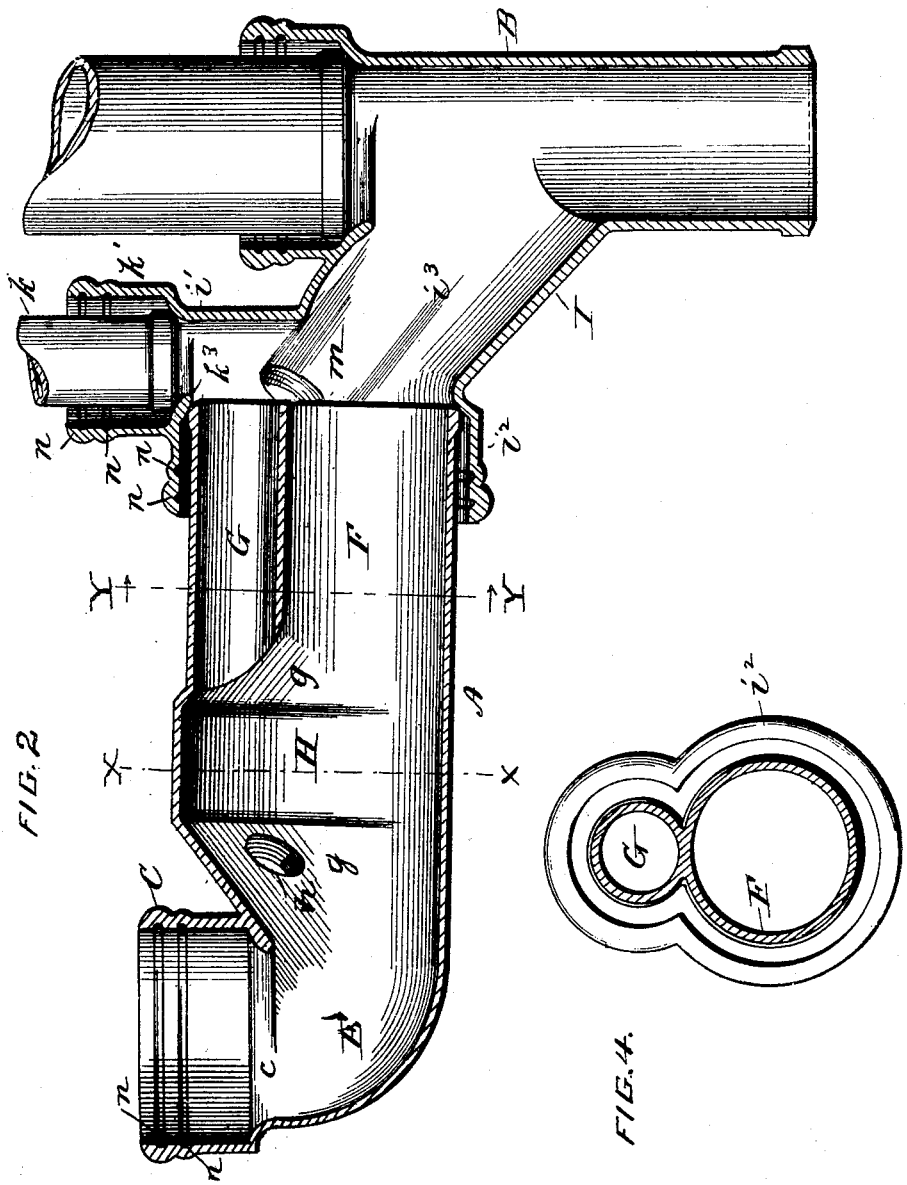

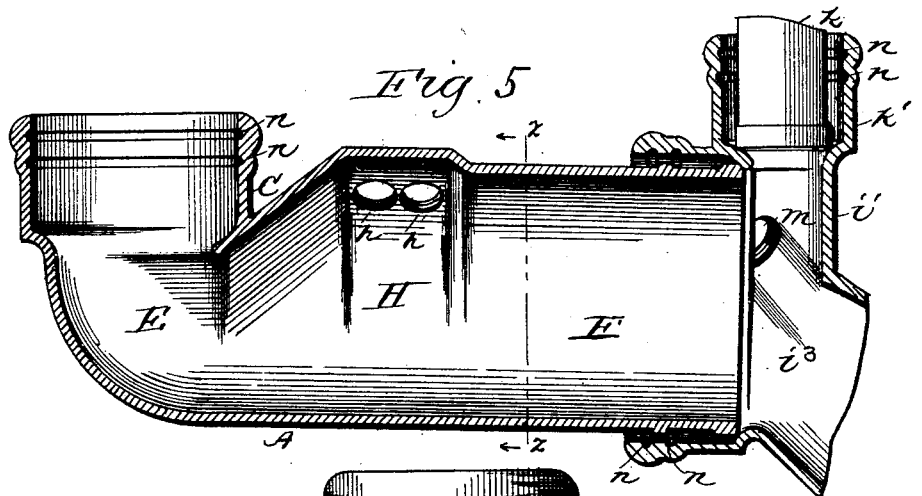
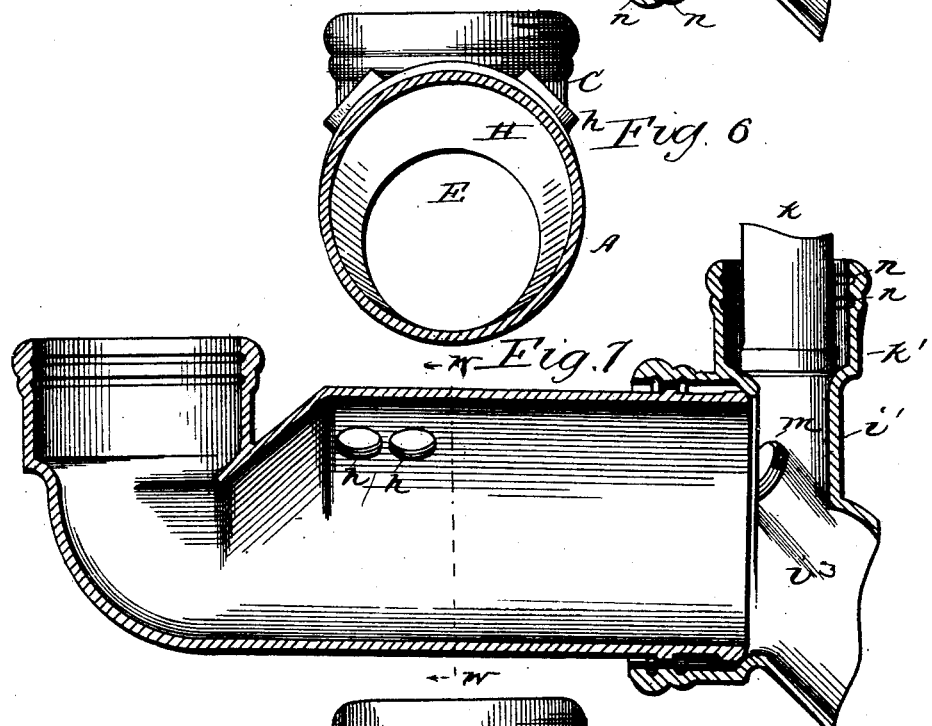
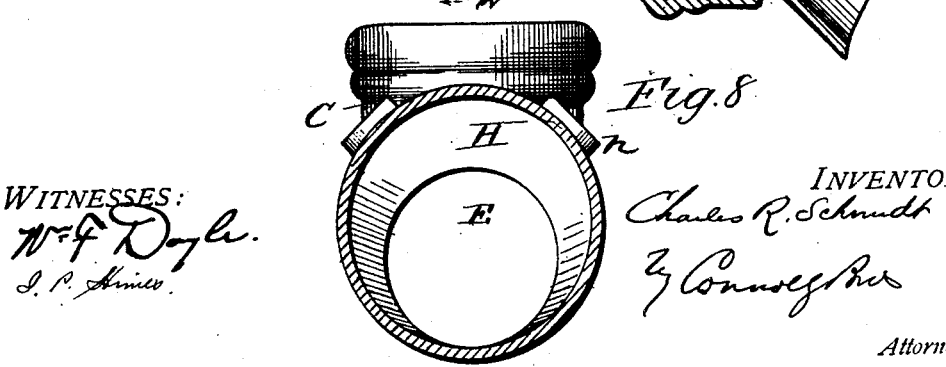

UNITED STATES PATENT OFFICE.

CHARLES R. SCHMIDT, OF BALTIMORE, MARYLAND.

FITTING FOR PLUMBING SYSTEMS.

No. 924,839.  Specification of Letters Patent.  Patented June 15, 1909.

Application filed August 14, 1908. Serial No. 448,566.

*To all whom it may concern:*

Be it known that I, CHARLES R. SCHMIDT, a citizen of the United States, residing at Baltimore, Maryland, have invented certain new and useful Improvements in Fittings for Plumbing Systems, of which the following is a specification.

My present invention has relation to the fittings used in plumbing systems, and particularly to the fittings intermediate of and connecting water closets, sinks, baths or basins with the main waste or soil pipe and with the main vent pipe.

The object of my invention is to provide a novel form of connection to take the place of the ordinary or other form of "bend" now in use, and which shall be adapted to more cheaply and effectively vent the system or such portions thereof as are in connection with the bend and prevent the formation of a kinetic seal and consequent siphoning or blowing of the traps and do away with the expensive and complex system now in use of separately venting each trap and fixture by a number of smaller vent pipes which easily become choked.

A further object of my invention is to provide a "bend" in which the venting branch is horizontal and parallel with the waste section of the bend and is so disposed as to vent the waste section near its junction with the outlet of the closet.

A further object of the invention is to provide a "bend" having a hump or enlargement of its bore whereby its capacity for venting is increased so as to permit of the use of connections from a plurality of trapped waste branches leading from sinks, basins, baths, etc., without danger of the formation of kinetic seals or the choking of the bend.

A further object of the invention is to provide a novel form of T Y adapted especially for connection to and use with the bends embodying my improvements, such T Y being constructed with a bell or faucet of such shape as to receive and embrace the outlet end of the bend, the said bend and faucet being in cross section of the form of two parallel pipes of different diameter joined together at their sides.

My invention consists in the novel constructions, combinations and arrangements hereinafter more particularly described.

In the accompanying drawings: Figure 1 is a side elevation of the structure embodying my invention. Fig. 2 is a partial vertical central sectional view of the same. Fig. 3 is a transverse section on the line X—X of Figs. 1 and 2. Fig. 4 is a similar section on the line Y—Y of Figs. 1 and 2. Figs. 5 and 7 are vertical central sections of modifications. Fig. 6 is a transverse section on the line Z—Z of Fig. 5. Fig. 8 is a transverse section on the line W—W of Fig. 7.

The "bend" A which embodies the principal features of my invention is a hollow casting intended and adapted to form the connection between the outlet of a water closet bowl and the main vertical waste or soil pipe B. This bend comprises a vertical faucet shaped inlet bowl C or mouth which receives the end of the flanges or pipe leading from the outlet passage of the closet. The contraction at the lower end of the bowl C indicated by the flange c forms a shoulder upon which the pipe rests; and below this flange the bend is formed with an elbow E which leads to and is an integral part of the "bend" proper. Said bend at its rear half portion comprises the two parallel pipes F G, joined together one upon the other and formed integral with the rest of the casting. The lowermost pipe F is the waste conduit, and is of the usual, or any required area, while the uppermost pipe G is the vent branch. Both these pipes lead to and enter or merge into the "hump" H or enlargement which is a short hollow cylindrical structure of greater bore capacity or area in cross section than the combined capacities or areas of the pipes F G. The pipes F G, may be entirely separated throughout their entire length or an air space may be left in the intervening partition. Again as shown in Figs. 5, 6, 7, 8, the bend may have a single conduit serving both as vent and waste, and in this case the spigot end of the bend will be cylindrical, and the faucet of the T Y, into which the spigot fits made correspondingly cylindrical. The hump or enlargement H is connected to and cast integral with the elbow E, and forms a communication between the elbow and the pipes F G, both elbow and pipes being of about the same diameter. The elbow E and pipe F are axially eccentric to the bore or cavity of the hump, and enter the same as low as possible thus leaving above the waste openings of the elbow and pipe a large venting space of imaginary crescent shape, and of considerably greater area than the pipe F. The ends of the hump form oblique walls g g, which are joined to the elbow E and pipes F G, as shown. This hump serves the twofold purpose of forming an air chamber of large capacity to which the vent pipe is connected by means of a horizontal branch and also of serving as a means for the convenient connection to the main waste of the trapped waste branches leading from other fixtures than closets without danger of the traps becoming siphoned. For the purpose of such connections I provide the hump of the bend with bossed or flanged and internally screw threaded openings h h, leading through the front oblique end of the hump, at such points on either side of the vertical diameter, and at such angles that the water passing down therethrough while it will be projected toward the waste pipe F will enter the cavity of the hump above the horizontal waste pipe G. Under these conditions the trapped branches or waste pipes from sinks, bath tubs, etc., will always be fully vented and cannot be siphoned.

The T Y to which the bend is coupled at its rear ends is a hollow casting I, comprising the vertical coupling member or section B, which is connected to and forms part of the main waste or soil pipe, the vertical vent branch $i'$ and the horizontal hub $i^2$ which receives the rear or spigot end of the "bend". The vent branch and bend socketing hub are terminal portions of the upwardly inclined leg $i^3$ through which they communicate with the vertical member B.

The hub or bowl $i^2$, instead of being of the usual cylindrical form is of a shape in cross section corresponding to the shape in cross section of the united waste and vent conduits of the bend i. e., of two incomplete circles. By reason of the shape in cross section of the bend near its rear end, a single bowl or faucet $i^2$ may be used, instead of a single bowl or faucet for each conduit. The construction of the bend and of the bowl $i^2$ with reference to their being thus coupled is a feature of considerable importance in the compact and economical construction of the fittings, while the use of a single bowl $i^2$ facilitates packing of the joint.

The vertical vent pipe k seats in the bowl or hub $k'$ of the vent branch $i'$, resting on the shoulder $k^3$, and vents into the T Y directly above and in close proximity to the horizontal vent conduit of the bend. If desired, provision may be made for additional waste connections by forming on the T Y, as shown at m open, threaded, connection bosses, corresponding to the bosses h at the forward end of the bend.

The joints produced at the several bowls or hubs may be packed in any approved manner but I prefer adopting and carrying out the mode of packing made possible by forming double parallel circumferential grooves n n, on the interior of the bowls, which are widened near their mouths for this purpose. When the pipes or branch connections are seated in the bowls, the lower portion of the sockets are packed with oakum or other soft packing material, and molten lead is then poured into the joint filling the space to or near to the mouth of the bowl. As the lead shrinks on cooling its shrinking diametrically, will cause it to leave the inner surface of the bowl, and tighten upon the pipe end or spigot. The shrinkage of the lead in the axial direction of the pipe is, however, compensated or taken up by the grooves n n, the lead shrinking against the lower part of the uppermost groove, and against the upper part of the lowermost groove, thus insuring an effective water tight seal. The lead may be afterward calked at its outer surface, thus further increasing the security of the seal.

I claim:

1. A fitting for plumbing systems, consisting of a horizontal waste conveying and venting bend, adapted to be located between a closet and a main waste pipe and composed of a hollow casting having parallel waste and vent conduits located one above the other, the vent conduit being above the waste, a chamber of greater area than the waste conduits, into which both said conduits lead, and connection parts for coupling the fitting to a closet and to a main vent and drain pipe.

2. A fitting for plumbing systems, consisting of an integral casting forming a coupling bend between a closet and drain pipe and comprising a horizontal waste conduit and a vent conduit parallel with and above said waste, an enlarged cavity constituting a hump, into which both conduits lead, and connecting bosses on said hump for the attachment of waste branches from other fittings.

3. A fitting for plumbing systems, consisting of a hollow casting comprising horizontal parallel vent and waste conduits, an enlarged vent chamber into which said conduits lead and coupling terminals, in combination with a waste Y connection leading to the main waste pipe and having a vent pipe connection, said Y having a bowl of a contour in cross section corresponding to the contour of the united vent and waste conduits of the fitting.

4. The combination with a fitting for plumbing systems consisting of a hollow casting adapted to lie between the waste outlet of a water closet bowl and the main waste and vent pipes and comprising horizontal, parallel waste and vent conduits of a coupling adapted to connect said fitting to the main waste pipe and having a bowl of the contour of both said conduits united and a vertically arranged vent branch and bowl, and coupling bosses for the attachment of other waste branches.

5. A fitting for plumbing systems, consisting of a bend, adapted to lie between the waste outlet of a water closet, and the Y leading to the main waste pipe, said bend comprising a horizontal waste conduit, a horizontal vent conduit above said waste conduit, and an enlarged cavity with which said conduits communicate and which is equal in diametrical area to that of both waste and vent conduits.

6. A fitting for plumbing systems, consisting of a hollow casting, adapted to lie between the waste outlet of a water closet and bath and basin wastes, the branch leading to the main waste pipe in which the cross sectional area at the spigot end is about equal to the combined cross sectional areas of the waste inlets and vent ducts.

7. A fitting for plumbing systems, consisting of a hollow casting forming a bend and a horizontal extension between the waste outlet of a water closet, and bath and basin wastes and the branch leading to the main waste pipe in which the cross sectional area of the extension at the spigot end is greater than the total cross sectional area of the waste inlets and vent ducts.

In testimony whereof I affix my signature in presence of two witnesses.

CHARLES R. SCHMIDT.

Witnesses:
   Jos. B. Connolly,
   Clyde B. Weikert.